May 9, 1967 P. J. KREUZBERGER ET AL 3,318,654
ADJUSTABLE LENGTH TEMPLE FOR EYEWEAR
Filed June 7, 1963 2 Sheets-Sheet 1
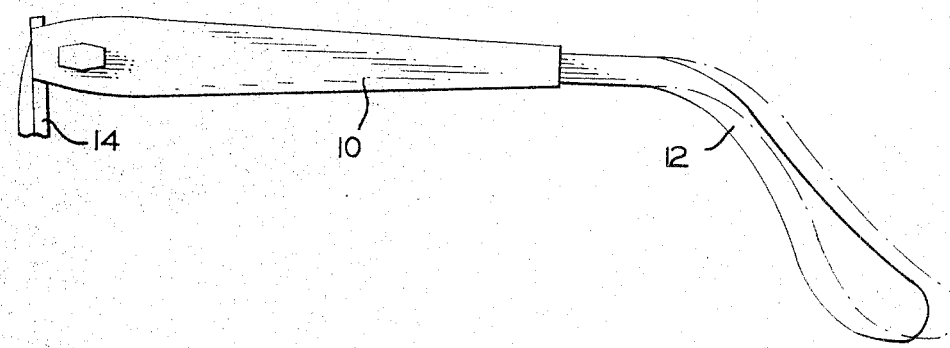
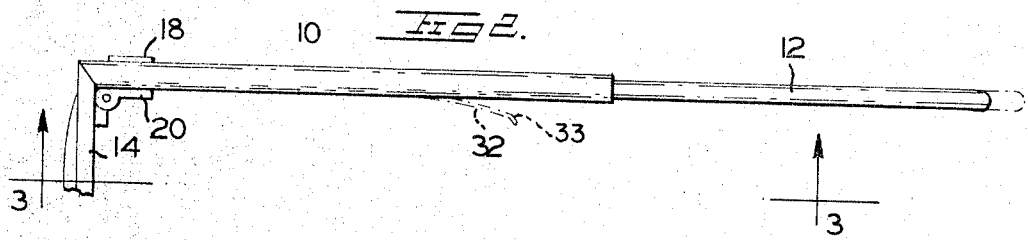
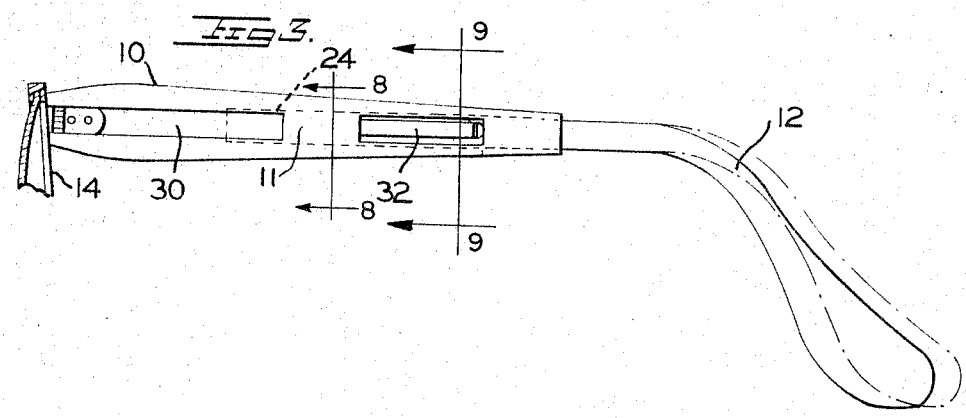
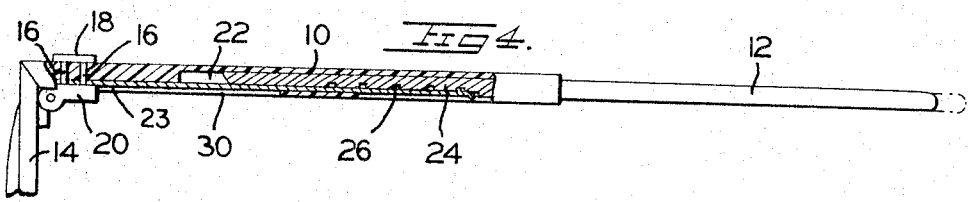
INVENTORS
PAUL J. KREUZBERGER
HOWARD JONES

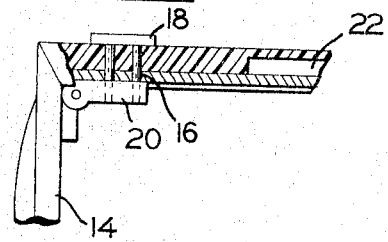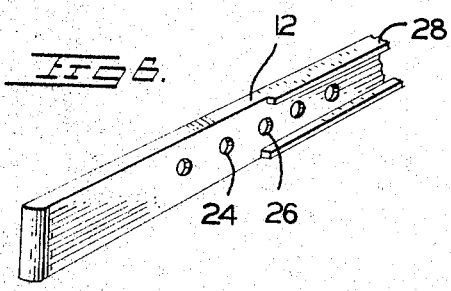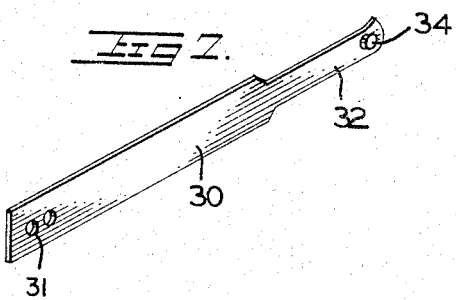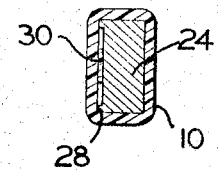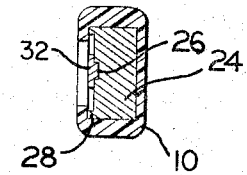

United States Patent Office 3,318,654
Patented May 9, 1967

3,318,654
ADJUSTABLE LENGTH TEMPLE FOR EYEWEAR
Paul J. Kreuzberger, Reading, Pa., and Howard Jones, Rockport, Maine, assignors, by mesne assignments, to Itek Corporation, a corporation of Delaware
Filed June 7, 1963, Ser. No. 286,310
1 Claim. (Cl. 351—118)

This invention relates to improvements in adjustable temples for eyewear and is concerned more particularly with adjustable temples adapted for opthalmic, sunglass or industrial eyewear.

A principal object of the invention is to provide an eyewear temple which may be readily adjusted to selected length appropriate for the wearer in a simple manner without the aid of tools, mechanical devices, or cements or the like. Further, the adjustment may be easily made by the wearer without other help.

The invention contemplates the provision of a temple composed of relatively slidable forward and rearward sections which may be readily locked in a selected adjusted position and just as readily released for further relative slidable movement for securement in another selected adjusted position.

The invention further contemplates the provision of an adjustable temple which has substantially the same size and appearance of any ordinary non-adjustable temple.

Other objects and advantages of the invention will be apparent from the following detailed description taken in conjunction with the accompanying drawings wherein a preferred embodiment of the principles of the invention has been selected for exemplification.

In the drawings:

FIG. 1 is an outer side elevational view of a temple constructed in accordance with the invention showing the rearward section thereof in broken lines to illustrate its extended adjustable position and illustrating the eyeframe and lenses in fragment;

FIG. 2 is a top plan view of the temple as shown in FIG. 1 and further showing in broken lines the extended position of the spring strip which locks the temple sections in desired adjusted positions;

FIG. 3 is taken on the line 3—3 of FIG. 2 and is an inner side elevational view of the temple as shown in FIG. 1 showing the exposed manually operable extremity of the spring strip;

FIG. 4 is a view similar to FIG. 2 but with the forward part in section to show the hinge connection of the temple to the eyeframe, and more particularly, to show the interfitting rearward section and the spring strip and engaging lug and socket means for locking the sections in selected adjustable position;

FIG. 5 is an enlarged view of the forward end of FIG. 4 showing in greater detail the hinge pin connection of the temple to the eyeframe and the dual use of such pins to anchor the forward end of the spring strip in fixed position;

FIG. 6 is an enlarged perspective view of the forward end portion of the rearward temple section showing the elongated series of sockets employed for adjustment;

FIG. 7 is an enlarged perspective view of the spring strip showing at its lefthand end portion the apertures through which the hinge pins extend and at its reduced righthand end portion the lug which selectively interfits the sockets shown in FIG. 6;

FIG. 8 is an enlarged transverse sectional view taken on the line 8—8 of FIG. 3 looking in the direction of the arrows; and FIG. 9 is an enlarged tranverse sectional view taken on the line 9—9 of FIG. 3.

Referring more particularly to the drawings, wherein like numerals refer to like parts, the temple of the present invention includes relatively slidable forward and rearward sections indicated at 10 and 12, respectively. The forward section is adapted to be hingedly connected to the front eyeframe and lens portion of the eyewear indicated in fragment at 14 in the conventional manner by pins or rivets 16 carried by a plate 18 and extending through the forward end portion of the temple section 10 and secured to the hinge 20.

In the preferred construction illustrated, the forward temple section 10 is provided with an open faced interior channel 22 for slidably receiving the forward end portion 24 of the rearward temple section 12. As shown in FIG. 4, channel 22 terminates in a shallow channel 23 at the forward end of temple section 10. The broken line showing of the ear engaging extremities of the rearward temple sections 12 as shown in FIGS. 1 through 4 indicates the relative slidable movement between the temple sections for effecting lengthwise adjustment of the temples so as appropriately to fit the individual wearer. In one particular embodiment of the invention the temples may be adjustable in lengths from 5½ inches to 6½ inches to meet the requirements of most adult individual users.

As best shown in FIGS. 4 and 6 the forward end portion 24 of the section 12 is provided with an elongated series of transverse bores or sockets 26 and shoulders 28 for guiding the sliding movement of the temple portion 24 within the channel 22 of the forward temple member 10.

For securing the temple members in selected adjusted position a strip 30 of thin metal or other suitable material, best shown in its entirety in FIG. 7, is fitted in the open face of the channel 22 and anchored in shallow channel 23 by the hinge rivets 16 which project through the end portion apertures 31 of the strip 30. Thus, the hinge rivets 16 serve the dual function of connecting the temple to the eyeframe and securing the strip 30 to the forward temple member 10. As shown best in FIGS. 4, 8 and 9 the forward end portion 24 of the rearward temple section 12 is slidably received in the hollow channel 22 between the strip 30 and the outer side wall portion of the forward temple member 10.

For manipulating the locking of the temple sections in desired adjusted position the rearward end portion of the strip 30 is provided with a reduced spring finger portion 32 which lies normally in the plane of the strip 30 as indicated in FIG. 4 but which, when the extremity thereof is engaged by the finger or fingernail of the person desiring adjustment of the temple, may be urged outwardly as indicated by the broken line showing in FIG. 2 to permit free sliding movement of the temple portion 24 lengthwise of the channel 22. For locking the temple section in selected adjusted position a lug 34 is carried by the rearward end portion of the spring finger 32 for engagement in any selected one of the sockets 26 when the spring finger 32 is relaxed to its normal planar position. Additionally, it will be noted that temple member 10 has an integral narrow transverse bridge section 11 which extends over channel 22 so as to provide a means for maintaining strip 30 and spring finger portion 32 in channel 22.

It will be apparent that the novel adjustable temple construction of the present invention may be embodied in temples of conventional size and appearance. It will also be apparent that all the adjusting and interlocking parts are housed within the confines of the forward temple section 10 and that no outwardly extending parts are present other than when the spring finger 32 is urged outwardly during times of adjustment. It will further be apparent that the temples of the present invention may be readily adjusted as to length without the aid of tools, mechanical devices or cements or the like such as in prior devices.

It is to be understood that the present invention is not confined to the particular construction and arrangement of parts as herein illustrated and described but embraces all such modifications thereof as may come within the scope of the following claim.

We claim:

An adjustable temple for eyewear comprising, relatively slidable forward and rearward temple sections, an open faced interior channel in said forward section for slidably receiving an end portion of said rearward section, said interior channel terminating at the forward end thereof in a shallow channel portion, a spring strip within one side of said interior channel, the forward end of said spring strip lying in said shallow channel portion underlying the temple hinge plate and being secured thereto by rivet means, the said end portion of said rearward section being received within said interior channel between said strip and the opposed sidewall of said interior channel, the rearward end of said spring strip defining a free spring finger portion lying normally in the plane of said strip within said interior channel and adjacent said open face thereof, said open face providing access to said spring finger, a narrow transverse bridge section integral with said forward section and extending across said open face for maintaining said spring finger portion in said channel, an outward extension at the free end of said spring finger portion terminating short of the exterior of said forward section, said extension providing means for manual movement of said spring finger outwardly to permit slidable movement of said end portion of said rearward section in said interior channel, projection means carried by and extending inwardly of said spring finger portion within said interior channel, a plurality of successive socket means carried by said end portion of said rearward section for selectively receiving said projection means for locking said temple sections in selected adjusted position, and transverse shoulder means in said end portion of said rearward section for guiding the sliding movement of the end portion within the interior channel of the forward temple section.

References Cited by the Examiner

UNITED STATES PATENTS

| 1,838,352 | 12/1931 | Anderson. | |
| 2,443,249 | 6/1948 | Jackson | 351—118 X |
| 2,721,498 | 10/1955 | Gerson | 351—118 X |
| 2,887,929 | 5/1959 | Farmer | 351—118 X |
| 3,052,161 | 9/1962 | Berend | 351—118 |
| 3,133,141 | 5/1964 | Anderson | 351—118 |
| 3,261,652 | 7/1966 | Magnus | 351—118 |

FOREIGN PATENTS

| 684,924 | 3/1930 | France. |
| 802,839 | 10/1958 | Great Britain. |

DAVID H. RUBIN, *Primary Examiner.*